(12) United States Patent
Okuno et al.

(10) Patent No.: US 10,310,364 B2
(45) Date of Patent: Jun. 4, 2019

(54) LIGHT SOURCE DEVICE AND PROJECTION DISPLAY APPARATUS

(71) Applicant: Panasonic Intellectual Property Management Co., Ltd., Osaka (JP)

(72) Inventors: Manabu Okuno, Osaka (JP); Takaaki Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/944,451

(22) Filed: Apr. 3, 2018

(65) Prior Publication Data

US 2018/0335685 A1 Nov. 22, 2018

(30) Foreign Application Priority Data

May 18, 2017 (JP) .................................. 2017-098682
Feb. 22, 2018 (JP) .................................. 2018-029692

(51) Int. Cl.
| | |
|---|---|
| G02B 27/20 | (2006.01) |
| G03B 21/20 | (2006.01) |
| G02B 5/08 | (2006.01) |
| F21V 7/22 | (2018.01) |
| G02B 27/14 | (2006.01) |
| G02B 27/28 | (2006.01) |

(Continued)

(52) U.S. Cl.
CPC .............. *G03B 21/204* (2013.01); *F21V 7/22* (2013.01); *F21V 13/14* (2013.01); *G02B 5/0816* (2013.01); *G02B 27/141* (2013.01); *G02B 27/283* (2013.01); *G03B 21/208* (2013.01); *G03B 21/2013* (2013.01); *G03B 21/2066* (2013.01); *G03B 21/2073* (2013.01); *F21S 10/007* (2013.01); *F21Y 2115/30* (2016.08)

(58) Field of Classification Search
None
See application file for complete search history.

(56) References Cited

U.S. PATENT DOCUMENTS

| | | |
|---|---|---|
| 2014/0293232 A1 | 10/2014 | Tanaka |
| 2016/0223895 A1 | 8/2016 | Okuda et al. |
| 2017/0082912 A1 | 3/2017 | Wakabayashi et al. |

FOREIGN PATENT DOCUMENTS

| | | |
|---|---|---|
| JP | 2013-061525 | 4/2013 |
| JP | 2014-209184 | 11/2014 |

(Continued)

*Primary Examiner* — Vip Patel
(74) *Attorney, Agent, or Firm* — Wenderoth, Lind & Ponack, L.L.P.

(57) ABSTRACT

The light source device and the projection display apparatus include a solid-state light source unit, a dichroic mirror, a fluorescent plate, a first wave plate, and a multi-reflection mirror. The solid-state light source unit emits first and second linearly polarized light rays at a predetermined ratio, the first and the second linearly polarized light rays being orthogonal to each other. The dichroic mirror separates the first and the second linearly polarized light rays, and combines blue light with yellow light. The fluorescent plate emits the yellow light to the dichroic mirror when the fluorescent plate is excited by the first linearly polarized light ray separated by the dichroic mirror. The first wave plate converts the second linearly polarized light ray separated by the dichroic mirror, into circularly polarized light. The multi-reflection mirror reflects the circularly polarized light to the dichroic mirror as the blue light.

13 Claims, 6 Drawing Sheets

(51) Int. Cl.
*F21V 13/14* (2006.01)
*F21S 10/00* (2006.01)
*F21Y 115/30* (2016.01)

(56) References Cited

FOREIGN PATENT DOCUMENTS

| | | |
|---|---|---|
| JP | 2016-145965 | 8/2016 |
| JP | 2016-180818 | 10/2016 |
| WO | 2015/151180 | 10/2015 |

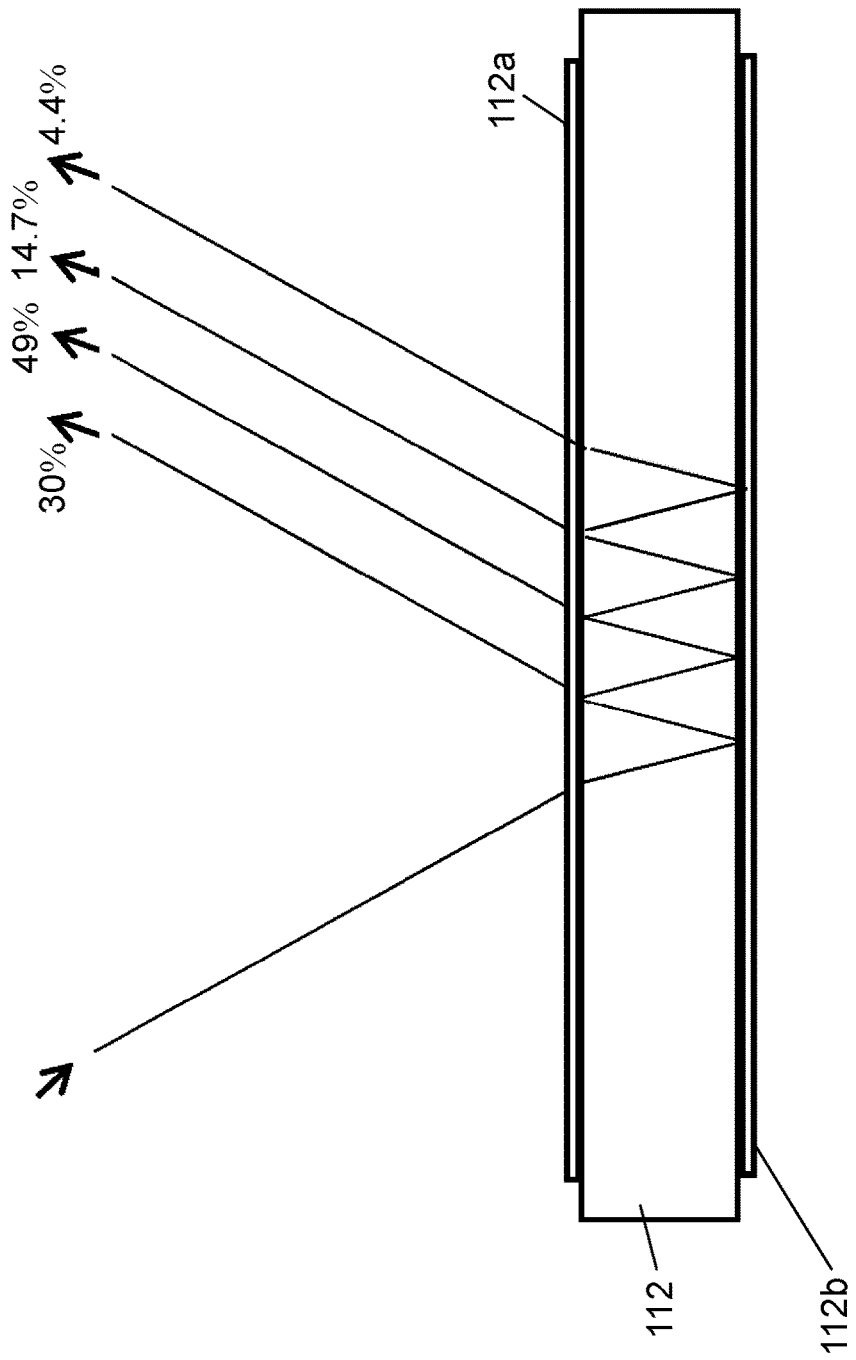

LIGHT SOURCE DEVICE AND PROJECTION DISPLAY APPARATUS

BACKGROUND

Technical Field

The present disclosure relates to a light source device equipped with a laser light source, and a projection display apparatus including the light source device.

Description of the Related Art

Patent Literature 1 (Japanese Unexamined Patent Application Publication No. 2013-61525) discloses a projector that prevents luminance unevenness and speckle noise in projected images by applying light from laser elements to a flat rotating wheel mounted with a diffusion layer such as a diffuser.

Meanwhile, Patent Literature 2 (Japanese Unexamined Patent Application Publication No. 2016-180818) discloses a projector that prevents speckle noise by applying light from laser elements to a multiple reflection element inclined with respect to the laser elements. The multiple reflection element has two parallel sides with different reflectances.

CITATION LIST

Patent Literature

Patent Literature 1: Japanese Unexamined Patent Application Publication No. 2013-61525
Patent Literature 2: Japanese Unexamined Patent Application Publication No. 2016-180818

SUMMARY

The present disclosure provides a light source device that prevents luminance unevenness and speckle noise in projected images when a laser light source is used as the light source device, and further provides a projection display apparatus including the light source device.

The light source device and the projection display apparatus according to the present disclosure include a solid-state light source unit, a dichroic mirror, a fluorescent plate, a first wave plate, and a multi-reflection mirror. The solid-state light source unit is configured to emit a first linearly polarized light ray and a second linearly polarized light ray at a predetermined ratio, the first linearly polarized light ray and the second linearly polarized light ray being orthogonal to each other. The dichroic mirror is configured to separate the first linearly polarized light ray and the second linearly polarized light ray, and to combine blue light with yellow light. The fluorescent plate is configured to emit the yellow light to the dichroic mirror when the fluorescent plate is excited by the first linearly polarized light ray separated by the dichroic mirror. The first wave plate is configured to convert the second linearly polarized light ray separated by the dichroic mirror, into circularly polarized light. The multi-reflection mirror is configured to reflect the circularly polarized light to the dichroic mirror as the blue light.

The light source device according to the present disclosure is effective to prevent luminance unevenness and speckle noise in projected images even when the light source device is composed of a simple laser light source.

BRIEF DESCRIPTION OF DRAWINGS

FIG. 6 shows effects of the multi-reflection mirror in the exemplary embodiment.

DETAILED DESCRIPTION OF THE PREFERRED EMBODIMENT

Exemplary embodiments will be described in detail as follows with reference to the accompanying drawings. In the exemplary embodiment, the description of well-known matter and of substantially the same configuration as described earlier may be omitted to avoid redundancy and help those skilled in the art understand them easily.

Note that the attached drawings and the following description are provided to make those skilled in the art fully understand the present disclosure and are not intended to limit the claimed subject matter.

Exemplary Embodiment

Figure 1:
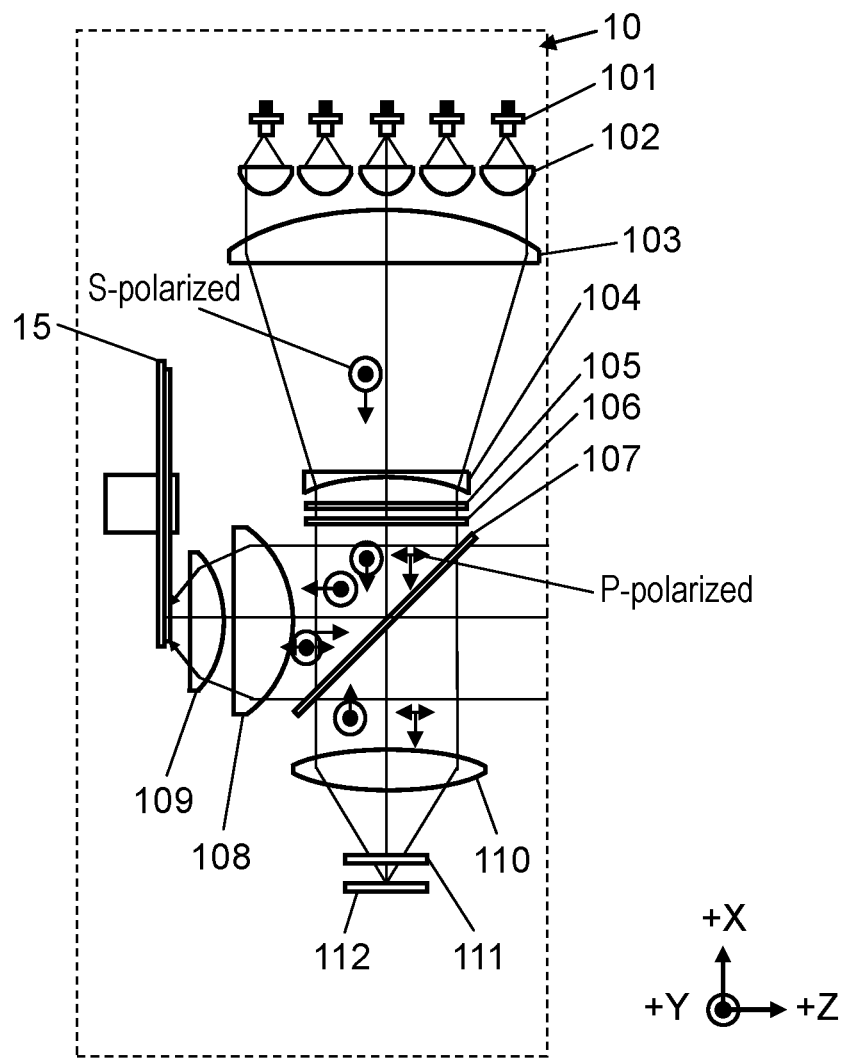
FIG. 1 shows the structure of a light source device according to an exemplary embodiment.

The exemplary embodiment will now be described with reference to FIGS. 1 to 6.
1-1 Structure of Light Source Device
1-1-1 Overall Structure of Light Source Device
FIG. 1 shows the structure of the optical system of light source device 10 including phosphor wheel 15. For convenience of explanation, an XYZ rectangular coordinate system is defined in FIG. 1.

First, light source device 10 will be described. Device 10 includes excitation light sources, which are composed of a plurality of laser light sources 101 to achieve high luminance. Laser light sources 101 are blue semiconductor lasers that emit blue linearly polarized light with wavelengths in the range of 447 to 462 nm. Although FIG. 1 shows only five of the blue semiconductor lasers arranged in a line, the lasers are actually arranged in a matrix in a plane. In FIG. 1 the lasers are so arranged that their light is polarized in the y-axis direction (s-polarized). The laser light emitted as excitation light from the semiconductor lasers is collimated by respective collimator lenses 102. Collimator lenses 102 emit approximately parallel light. The light is collected by lens 103, is again approximately paralleled by lens 104, and passes through diffuser 105. The light from diffuser 105 is applied to quarter-wave plate 106, which is inclined at an angle with respect to the x axis.

Thus, the inclination of quarter-wave plate 106 with respect to the optical axis along the x axis is adjusted such that quarter-wave plate 106 can emit the incident light as elliptically-polarized light. To be more specific, quarter-wave plate 106 emits the incident light by converting its polarization state at a predetermined intensity ratio of the s-polarized and p-polarized components (e.g., 80% s-polarized component and 20% p-polarized component).

Laser light sources 101, collimator lenses 102, lenses 103 and 104, diffuser 105, and quarter-wave plate 106 together compose an example of a solid-state light source unit. Laser light sources 101 are an example of a semiconductor laser light source. Quarter-wave plate 106 is an example of a second wave plate, which converts the polarization state of the light from laser light sources 101 and emits two orthogonal linearly polarized light rays at a predetermined ratio.

Diffuser 105 is a flat glass with a micro-rough diffusing surface.

The light that has passed quarter-wave plate 106 strikes dichroic mirror 107 inclined at approximately 45 degrees with respect to the optical axis.

Figure 3:
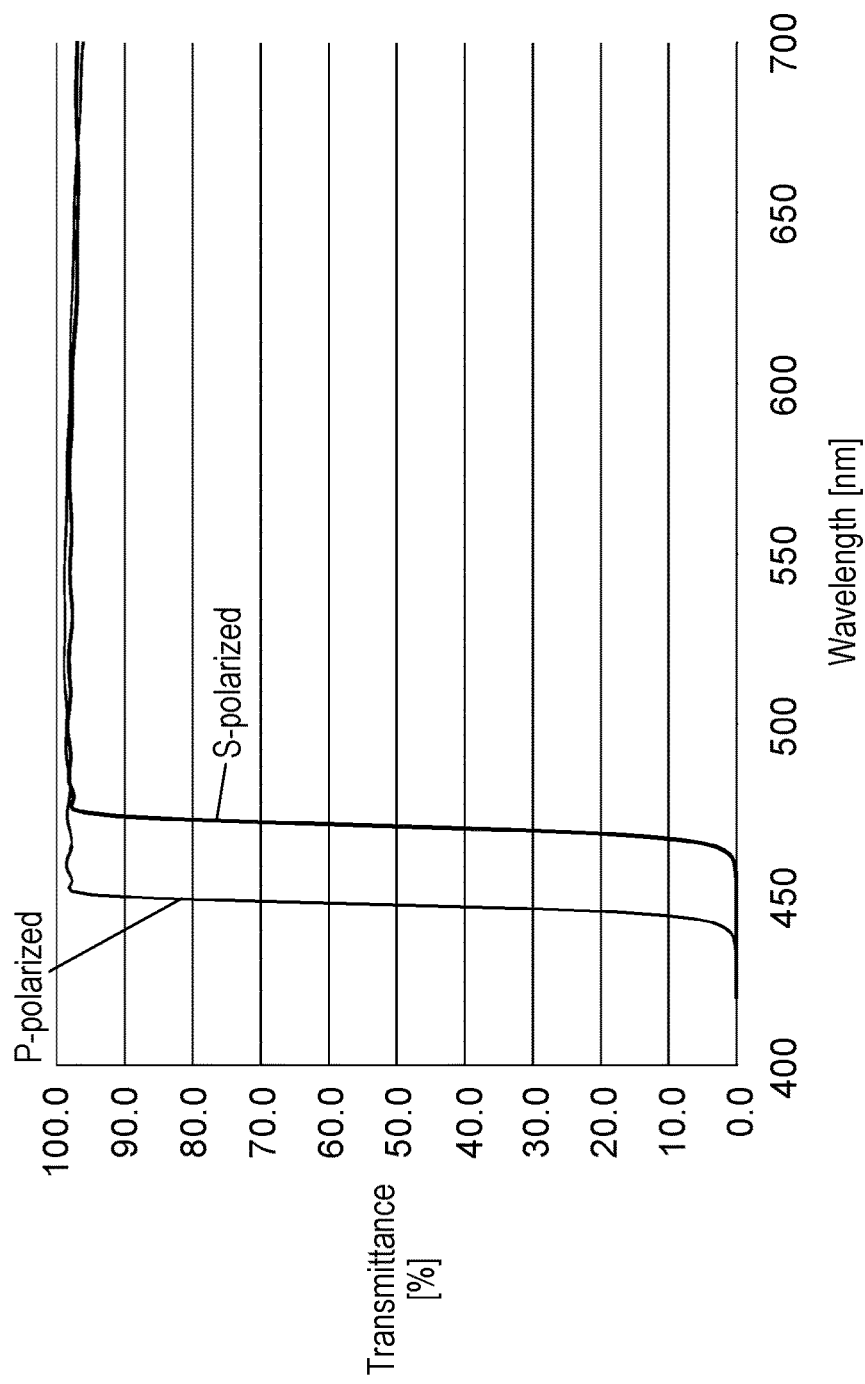
FIG. 3 shows transmittances at different wavelengths of a dichroic mirror included in the light source device according to the exemplary embodiment.

FIG. 3 shows the spectral transmittance of dichroic mirror 107. Dichroic mirror 107 has a wavelength of 465 nm for s-polarized light and a wavelength of 442 nm for p-polarized light when the transmittance is 50%. Therefore, the blue light with wavelengths of 447 to 462 nm is split, depending on its polarization state, into two rays: one passing through dichroic mirror 107 and the other being reflected by dichroic mirror 107. To be more specific, dichroic mirror 107 reflects the s-polarized component of the blue light and allows the p-polarized component of the blue light to pass through it. Dichroic mirror 107 has the property of transmitting at least 96% of yellow light containing green and red components. Thus, dichroic mirror 107 splits the light from the solid-state light source unit depending on its polarization state and combines the blue light with yellow light containing the green and red components as will be described later.

Referring back to FIG. 1, the s-polarized component, which is one of the two linearly polarized light rays incident on dichroic mirror 107 in the negative X direction, is reflected by dichroic mirror 107 and is emitted in the negative Z direction. Meanwhile, the p-polarized component, which is the other linearly polarized light ray, passes through dichroic mirror 107 and propagates along the negative X direction. The laser light emitted in the negative Z direction is collected by lenses 108 and 109, and then excites the phosphor on phosphor wheel 15.

Figure 2:
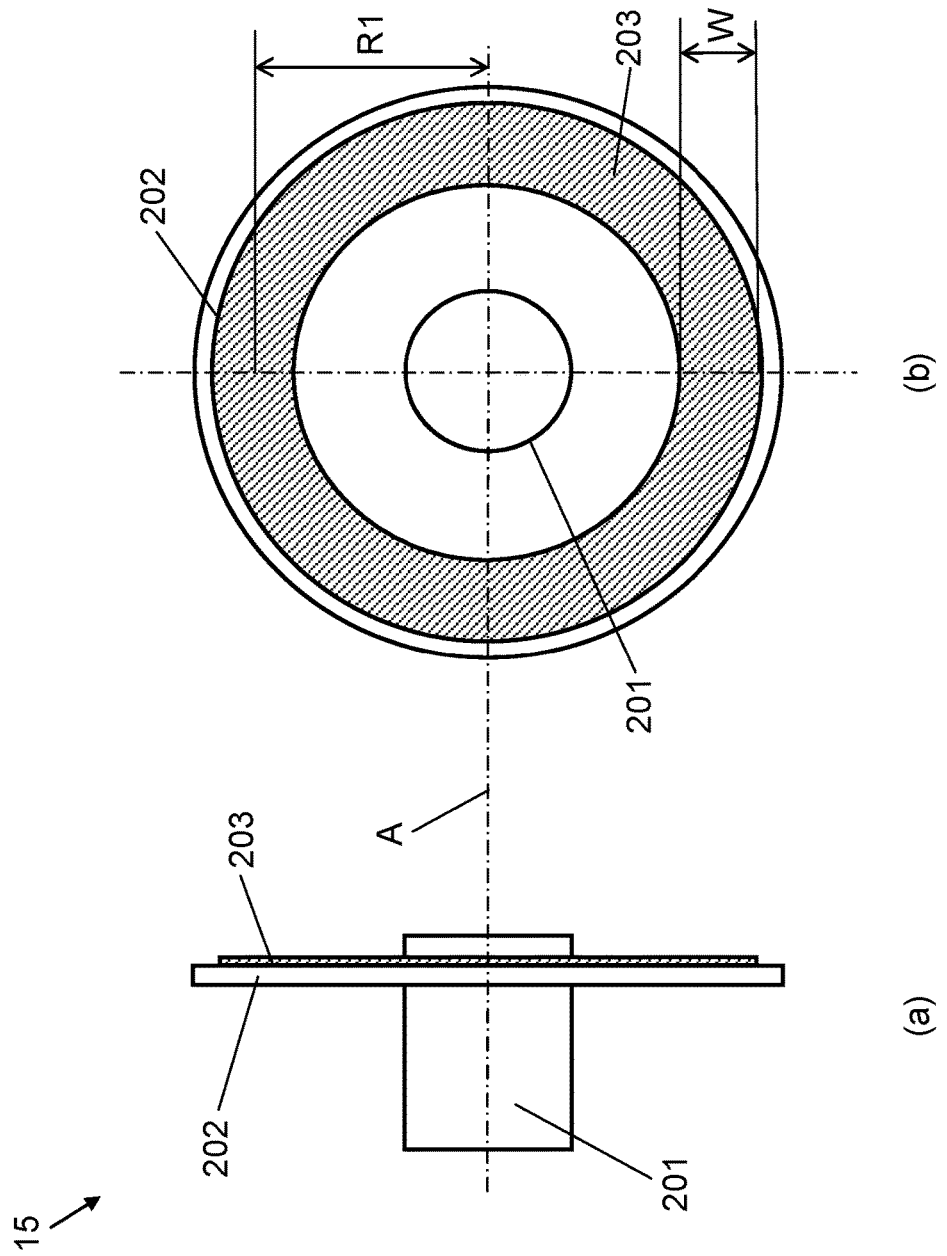
FIG. 2 shows a phosphor wheel included in the light source device according to the exemplary embodiment.

As shown in the side view (a) of FIG. 2, phosphor wheel 15 is composed of motor 201; rotating substrate 202, which is a disk rotating about the shaft of motor 201; and yellow phosphor 203, which is formed on rotating substrate 202.

As shown in the front view (b) of FIG. 2, yellow phosphor 203 on rotating substrate 202 is shaped like a ring with a predetermined width W. The middle of the width W is distant by a distance R1 from the axial rotation center A of the phosphor wheel. The side of rotating substrate 202 that has yellow phosphor 203 thereon functions a reflective surface.

When the laser light from laser light sources 101 is collected on yellow phosphor 203 of phosphor wheel 15, yellow phosphor 203 is excited and emits yellow light containing green and red components.

Phosphor wheel 15 is an example of a fluorescent plate that is excited by one of the linearly polarized light rays separated from the other ray by dichroic mirror 107 and that emits yellow light (containing green and red components). Lenses 108 and 109 are an example of a first light-condensing element.

Referring back to FIG. 1, the yellow light emitted from phosphor wheel 15 propagates along the positive Z direction. The fluorescence emitted in the negative Z direction from yellow phosphor 203 is reflected by the reflective surface of rotating substrate 202 and is emitted in the positive Z direction. These yellow light rays, which are unpolarized light, are paralleled by lenses 109 and 108 and then pass through dichroic mirror 107.

Meanwhile, the p-polarized light of the blue light emitted by the blue semiconductor lasers and then passed through dichroic mirror 107 is collected by lens 110, passes through quarter-wave plate 111 to be converted into circularly polarized light, and strikes multi-reflection mirror 112, which is placed near the focus of lens 110. The blue light incident on multi-reflection mirror 112 is reflected by multi-reflection mirror 112, again passes through quarter-wave plate 111 to be s-polarized, is collected by lens 110 into approximately parallel light, and is reflected by dichroic mirror 107. Lens 110 is an example of a second light-condensing element, whereas quarter-wave plate 111 is an example of a first wave plate.

Thus, dichroic mirror 107 combines the yellow light (containing the green and red components) from phosphor wheel 15 with the blue light from multi-reflection mirror 112, and then emits white light.

Figure 4:
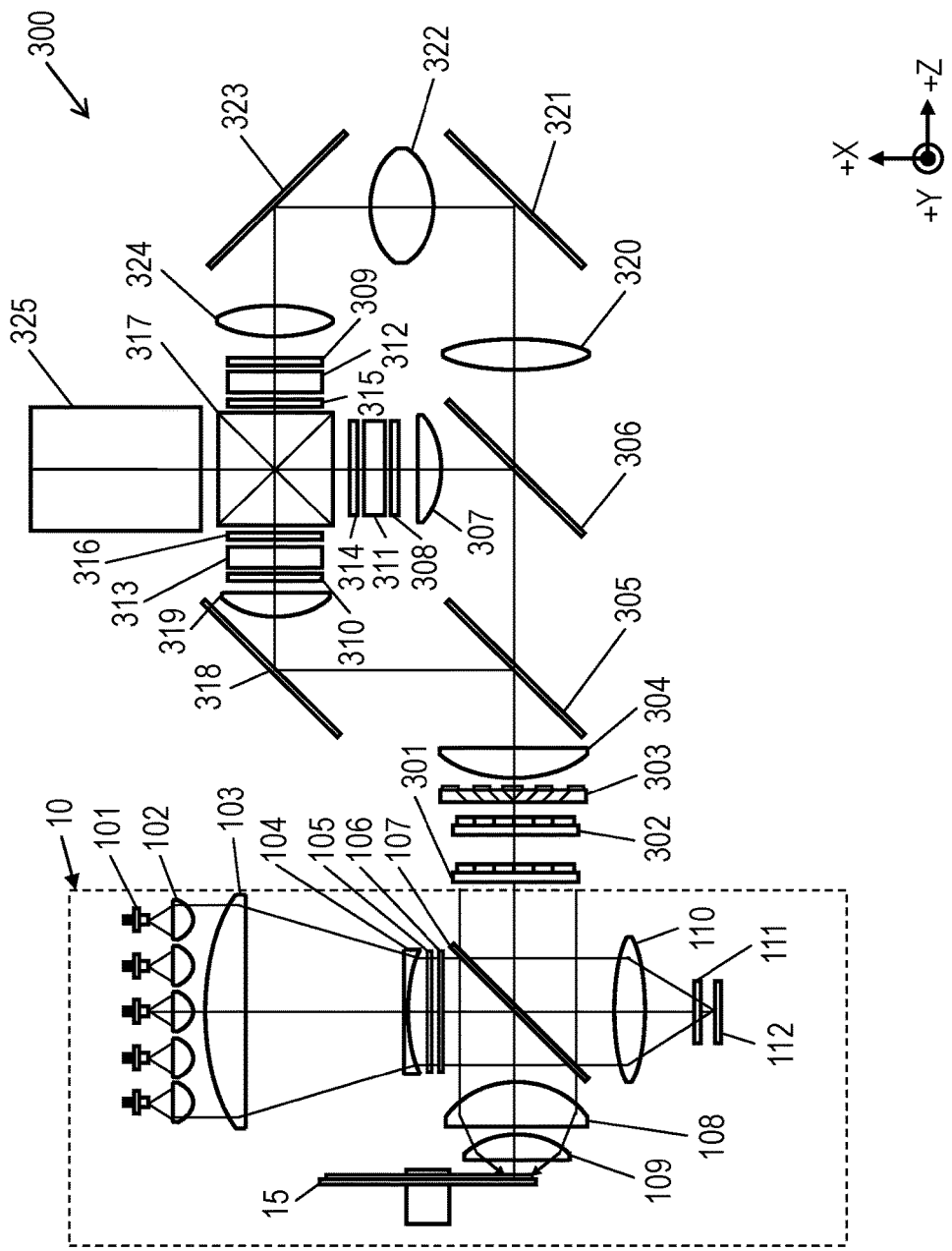
FIG. 4 shows the structure of a projection display apparatus mounted with the light source device according to the exemplary embodiment.

FIG. 4 shows projection display apparatus 300, which operates with the white light emitted from light source device 10. The white light from light source device 10 strikes first lens array plate 301, which is composed of a plurality of lens elements. The rays of light incident on first lens array plate 301 are split into a larger number of rays of light. The larger number of rays of light are converged by second lens array plate 302 composed of a plurality of lenses. The lens elements of first lens array plate 301 are open similar to liquid crystal panels 311, 312, and 313. The focal length of the lens elements of second lens array plate 302 is determined such that first lens array plate 301 and liquid crystal panels 311 to 313 are in approximate conjugate relation. The light from second lens array plate 302 strikes polarization converter 303.

Polarization converter 303, which is composed of a polarizing prism and a half-wave plate, converts natural light from the light source into light in one direction of polarization (s-polarized light). The yellow light as fluorescence is natural light, and therefore, is converted in one direction of polarization. Meanwhile, the blue light, which strikes as s-polarized light, is not subjected to conversion. The light from polarization converter 303 strikes superimposing lens 304. Superimposing lens 304 is used to superimpose the light from each lens element of second lens array plate 302 upon liquid crystal panels 311, 312, and 313. First lens array plate 301, second lens array plate 302, polarization converter 303, and superimposing lens 304 together compose an illumination optical system, which collects the light from light source device 10 and applies it to an area to be illuminated.

The light from superimposing lens 304 is split into blue, green, and red light by blue-reflecting dichroic mirror 305 and green-reflecting dichroic mirror 306, which are color separating means. The green light passes through field lens 307 and incident-side polarizing plate 308, and then strikes liquid crystal panel 311. The blue light is reflected by reflective mirror 318, then passes through field lens 319 and incident-side polarizing plate 310, and strikes liquid crystal panel 313. The red light passes through (refracted by) relay lenses 320 and 322, reflected by reflective mirrors 321 and 323, passes through field lens 324 and incident-side polarizing plate 309, and strikes liquid crystal panel 312.

Three liquid crystal panels 311, 312, and 313 produce green, red, and blue images, respectively as follows. These panels change the polarization state of incident light by controlling the voltage applied to the image pixels according to the video signals. In other words, the light is modulated by combining incident-side polarizing plates 308, 309, and 310 with emission-side polarizing plates 314, 315, and 316. Incident-side polarizing plates 308 to 310 are placed on one side of liquid crystal panels 311 to 313, respectively, whereas emission-side polarizing plates 314 to 316 are placed on the other side of liquid crystal panels 311 to 313, respectively. These incident-side polarizing plates 308 to 310 and emission-side polarizing plates 314 to 316 are orthogonal to their respective transmission axis. After passing through emission-side polarizing plates 314 to 316, the red light and the blue light are reflected by a red-reflecting dichroic mirror and a blue-reflecting dichroic mirror, respectively through color combining prism 317, and then are combined with green light. The resulting light strikes projection lens 325 as video light, which is an image produced by the liquid crystal panels. The light incident on projection lens 325 is projected in an enlarged scale on the screen (not shown).

1-1-2 Structure of the Essential Part of Light Source Device

Figure 5:
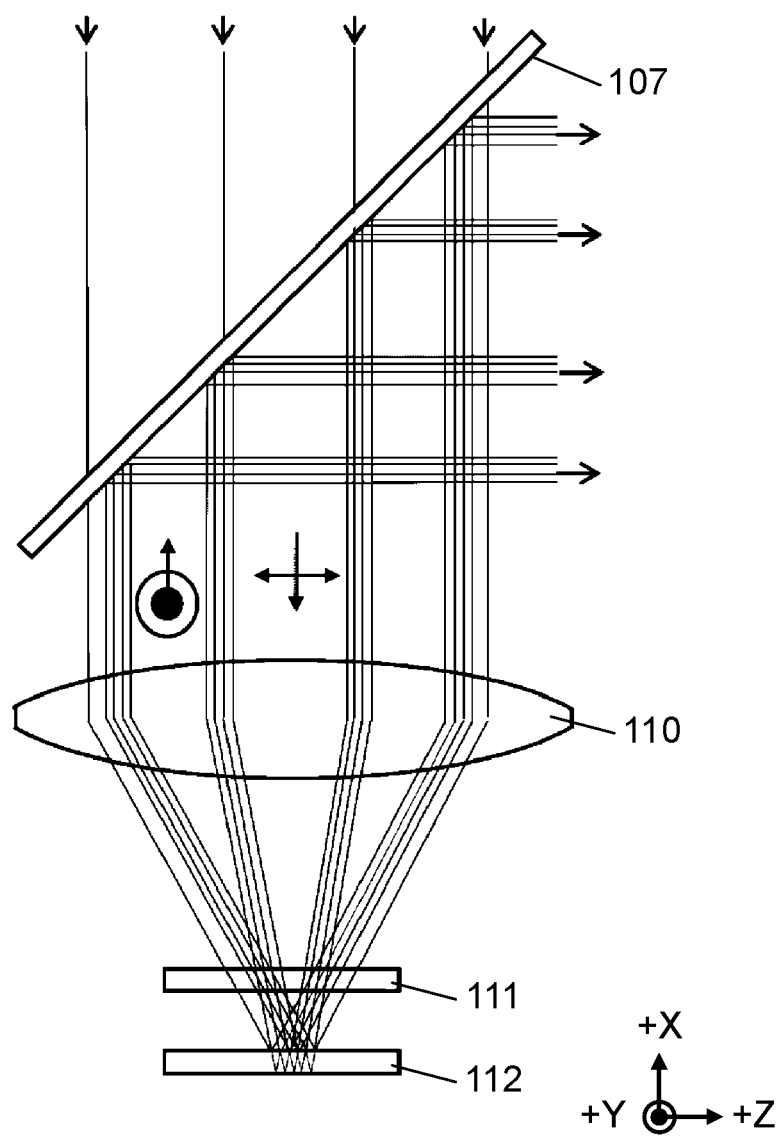
FIG. 5 shows light rays reflected by a multi-reflection mirror in the exemplary embodiment.

Effects of multi-reflection mirror 112 in light source device 10 will now be described with reference to FIGS. 5 and 6. As shown in FIG. 5, the p-polarized blue light that has passed dichroic mirror 107 is collected by lens 110, passes through quarter-wave plate 111 to be converted into circularly polarized light, and strikes multi-reflection mirror 112. The circularly polarized blue light is then reflected by multi-reflection mirror 112 to be split into a plurality of rays of light, again passes through quarter-wave plate 111 to be s-polarized, is approximately paralleled by lens 110, and is reflected by dichroic mirror 107. Multi-reflection mirror 112 is a reflector plate placed near the focus of lens 110 (i.e., the focal point of the second light-condensing element).

FIG. 6 shows the structure of multi-reflection mirror 112. Multi-reflection mirror 112 has a first surface which the blue light strikes, and a second surface, which is the reverse side of multi-reflection mirror 112 from the first surface. The first surface is mounted with partial reflection coating 112a, and the second surface is mounted with total reflection coating 112b. Partial reflection coating 112a is a dielectric multilayer coating with 30% reflectance and 70% transmittance, and total reflection coating 112b is a dielectric multilayer coating with 98 to 100% reflectance.

Partial reflection coating 112a reflects 30% of the incident light and allows 70% of the light to pass through it. The 70% of the passed light is reflected by total reflection coating 112b formed on the reverse side. Next, partial reflection coating 112a reflects 30% of the 70% light and allows 70% of the 70% light, that is, 49% of the light to pass through it. Multi-reflection mirror 112 repeats the reflection and transmission in the same manner, emitting the light of 14.7%, 4.4%, . . . . As shown in FIG. 6, the rays of light from multi-reflection mirror 112 are split into a larger number of rays of light at the above-mentioned intensity ratio, are approximately paralleled by lens 110, and are reflected by dichroic mirror 107.

In multi-reflection mirror 112 used in the present exemplary embodiment, partial reflection coating 112a has 30% reflectance; however, the reflectance can alternatively be selected from the range of 20% to 50% to optimize the separation of the rays of light.

1-1-3 Effects of Light Source Device

As described above, in the present exemplary embodiment, multi-reflection mirror 112 can split a plurality of blue rays of light into a larger number of rays of light. Furthermore, placing multi-reflection mirror 112 near the focus of lens 110 can miniaturize the optical system. The rays of light split by multi-reflection mirror 112 are applied uniformly to first lens array plate 301. These features reduce luminance unevenness and speckle noise in the projected images and also miniaturize the light source device.

Other Exemplary Embodiments

The above exemplary embodiment has been described as a technical example of the present application, and techniques of the present disclosure are not limited to those described in the above exemplary embodiment and are applicable to other exemplary embodiments provided with modification, replacement, addition, omission, etc. It is also possible to create additional exemplary embodiments by combining components described in the above exemplary embodiment.

The above-described exemplary embodiment has described a case in which quarter-wave plate 106 converts the polarization state of the blue light from laser light sources 101 to the intensity ratio of 80% s-polarized component and 20% p-polarized component. However, in the present disclosure, the intensity ratio is not limited to this and can be determined to optimize the distribution of wavelengths of the white light emitted from light source device 10.

In the above-described exemplary embodiment, the first light-condensing element is composed of two lenses 108 and 109, but may alternatively be composed of one, three, or more lenses. In the exemplary embodiment, the second light-condensing element is composed of lens 110 alone, but may alternatively be composed of a plurality of lenses.

In the exemplary embodiment, lens 110 as an example of the second light-condensing element is placed between dichroic mirror 107 and quarter-wave plate 111 as an example of the first wave plate. Alternatively, however, quarter-wave plate 111 may be placed between dichroic mirror 107 and lens 110.

Light source device 10 in the above-described exemplary embodiment can further include a diffuser between dichroic mirror 107 and multi-reflection mirror 112. The diffuser can be placed, for example, between dichroic mirror 107 and lens 110, which is the second light-condensing element, or between lens 110 and quarter-wave plate 111, which is the first wave plate. Providing the diffuser further homogenizes the blue light reflected by multi-reflection mirror 112.

INDUSTRIAL APPLICABILITY

The present disclosure is applicable to a light source device or a projection display apparatus such as a projector.

What is claimed is:

1. A light source device comprising:
a solid-state light source unit configured to emit a linearly polarized light ray;
a dichroic mirror configured to separate the linearly polarized light ray into a first linearly polarized light ray and a second linearly polarized light ray, a polarization of the second linearly polarized light ray being orthogonal to a polarization of the first linearly polarized light ray;
a fluorescent plate configured to emit light to the dichroic mirror when the fluorescent plate is excited by the first linearly polarized light ray;
a first wave plate configured to convert the second linearly polarized light ray into circularly polarized light; and
a multi-reflection mirror configured to reflect the circularly polarized light through the first wave plate to the dichroic mirror.

2. The light source device according to claim 1,
wherein the solid-state light source unit comprises:
a semiconductor laser light source configured to emit blue light; and
a second wave plate configured to emit the linearly polarized light ray by converting a polarization state of the blue light emitted from the semiconductor laser light source.

3. The light source device according to claim 1, further comprising a light-condensing element configured to collect (i) the first linearly polarized light ray and (ii) the light emitted from the fluorescent plate.

4. The light source device according to claim 1, further comprising a light-condensing element configured to collect (i) the second linearly polarized light ray and (ii) light obtained by the multi-reflection mirror reflecting the circularly polarized light through the first wave plate.

5. The light source device according to claim 4, wherein the multi-reflection mirror is placed near a focal point of the light-condensing element.

6. The light source device according to claim 4, wherein the first wave plate is placed between the multi-reflection mirror and the light-condensing element.

7. The light source device according to claim 1, wherein the multi-reflection mirror has a predetermined incident surface with a reflectance of 20% to 50%, inclusive.

8. The light source device according to claim 1, further comprising a diffuser placed between the dichroic mirror and the first wave plate.

9. A projection display apparatus comprising the light source device according to claim 1.

10. The light source device according to claim 1,
wherein the multi-reflection mirror includes a first surface and a second surface, and
wherein in the multi-reflection mirror, the circularly polarized light is reflected between the first surface and the second surface.

11. The light source device according to claim 10, wherein the first surface of the multi-reflection mirror has a partial reflection coating, and the second surface of the multi-reflection mirror has a total reflection coating.

12. The light source device according to claim 1,
wherein the light emitted by the fluorescent plate when the fluorescent plate is excited by the first linearly polarized light ray is yellow light,
wherein light obtained by the multi-reflection mirror reflecting the circularly polarized light through the first wave plate is blue light, and
wherein the dichroic mirror emits white light by combining (i) the yellow light emitted by the fluorescent plate when the fluorescent plate is excited by the first linearly polarized light ray with (ii) the blue light obtained by the multi-reflection mirror reflecting the circularly polarized light through the first wave plate.

13. The light source device according to claim 1, wherein the first linearly polarized light ray is an s-polarized component of the linearly polarized light ray, and the second linearly polarized light ray is a p-polarized component of the linearly polarized light ray.

* * * * *